(12) United States Patent
Russell

(10) Patent No.: US 7,104,297 B2
(45) Date of Patent: Sep. 12, 2006

(54) ENERGY RETURN WHEEL SYSTEMS AND METHODS

(76) Inventor: Brian A. Russell, 6171 Rain Dance Trail, Littleton, CO (US) 80125-9268

( * ) Notice: Subject to any disclaimer, the term of this patent is extended or adjusted under 35 U.S.C. 154(b) by 30 days.

(21) Appl. No.: 10/796,900

(22) Filed: Mar. 8, 2004

(65) Prior Publication Data

US 2005/0000611 A1 Jan. 6, 2005

Related U.S. Application Data

(63) Continuation-in-part of application No. 10/778,944, filed on Feb. 13, 2004, now abandoned, and a continuation-in-part of application No. 10/151,712, filed on May 20, 2002, now Pat. No. 6,701,985.

(51) Int. Cl.
*B60C 7/10* (2006.01)

(52) U.S. Cl. .................. 152/41; 152/30; 152/47; 152/50; 152/254

(58) Field of Classification Search ............. 152/30, 152/40, 41, 42, 47, 48, 49, 50, 56, 57, 58, 152/254, 256, 258, 259, 271, 273
See application file for complete search history.

(56) References Cited

U.S. PATENT DOCUMENTS

| | | | |
|---|---|---|---|
| 863,827 A | 8/1907 | Alloatti | |
| 1,012,331 A | 12/1911 | Cunningham | |
| 1,024,091 A | 4/1912 | Martin et al. | |
| 1,054,444 A | 2/1913 | Olivier | |
| 1,123,529 A | 1/1915 | Harlan | |
| 1,134,291 A | 4/1915 | Spencer | |
| 1,213,834 A | 1/1917 | Bunzlau et al. | |
| 1,233,462 A * | 7/1917 | Frommann | 152/50 |
| 1,312,582 A | 8/1919 | Schneible | |
| 1,319,726 A | 10/1919 | Schramm | |
| 1,403,115 A | 1/1922 | Golein | |
| 1,447,365 A | 3/1923 | Walther | |
| 1,449,920 A | 3/1923 | Stanley | |
| 1,519,971 A * | 12/1924 | Hale | 152/47 |
| 1,555,479 A * | 9/1925 | Morand | 152/47 |
| 1,646,480 A | 10/1927 | Harpstrite | |
| 1,650,271 A | 11/1927 | Harpstrite | |
| 1,684,596 A * | 9/1928 | Patch | 152/41 |
| RE23,161 E * | 10/1949 | MacLean | 152/41 |
| 4,573,510 A | 3/1986 | Ippen et al. | |
| 5,372,170 A * | 12/1994 | Hynes | 152/42 |
| 6,701,985 B1* | 3/2004 | Russell | 152/47 |
| 6,732,775 B1* | 5/2004 | Kikuchi et al. | 152/47 |

FOREIGN PATENT DOCUMENTS

GB 12249 0/1906

* cited by examiner

*Primary Examiner*—Russell D. Stormer
(74) *Attorney, Agent, or Firm*—Townsend and Townsend and Crew LLP

(57) ABSTRACT

The present invention provides exemplary wheel assemblies for use with a wide range of wheeled vehicles and apparatus. In one embodiment, a wheel assembly (800) includes a rim (810) having edges (816, 818). The wheel assembly includes a plurality of protrusions 822 disposed in a trough portion (820) between the rim edges. A resilient member (830) is disposed over the spaced protrusions, and an actuator (850) is disposed over the resilient layer. The actuator is adapted to at least partially compress the resilient layer between the spaced protrusions when the wheel assembly is loaded with a weight. In this manner, the wheel assembly is capable of providing energy return to the wheel assembly during rotation thereof.

10 Claims, 14 Drawing Sheets

SECTION A-A

Fig. 1A
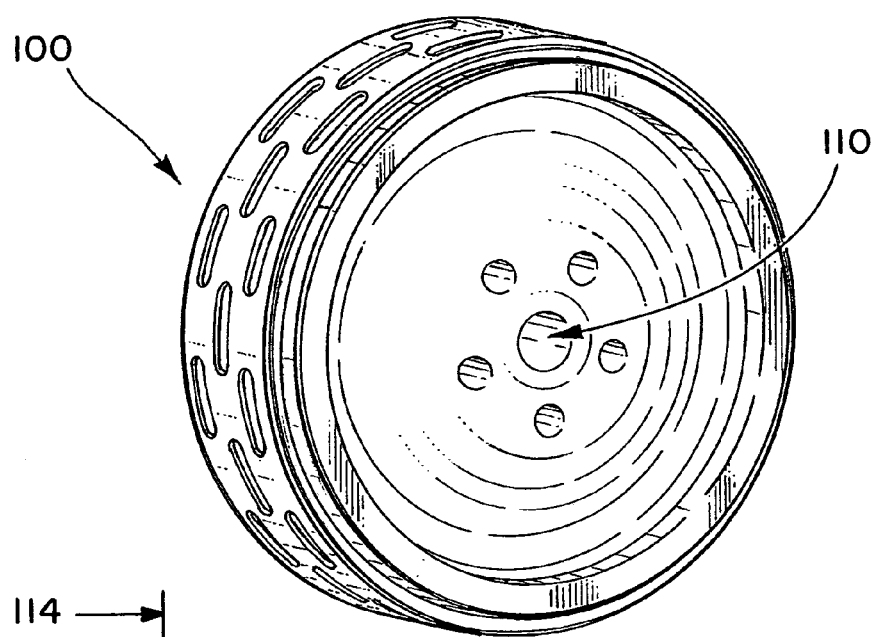
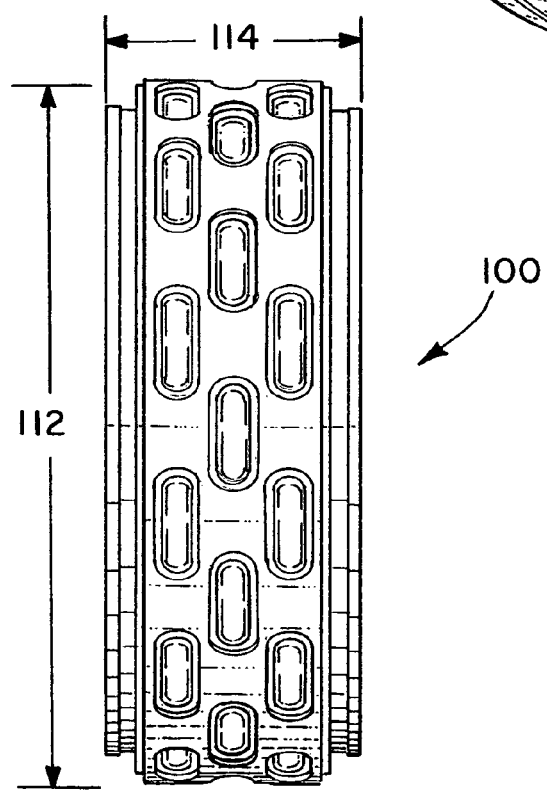
Fig. 1B

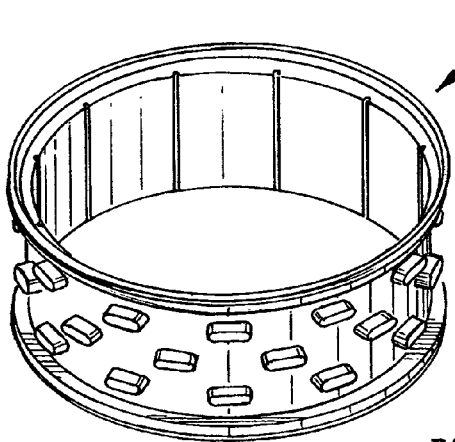
*Fig. 3A*
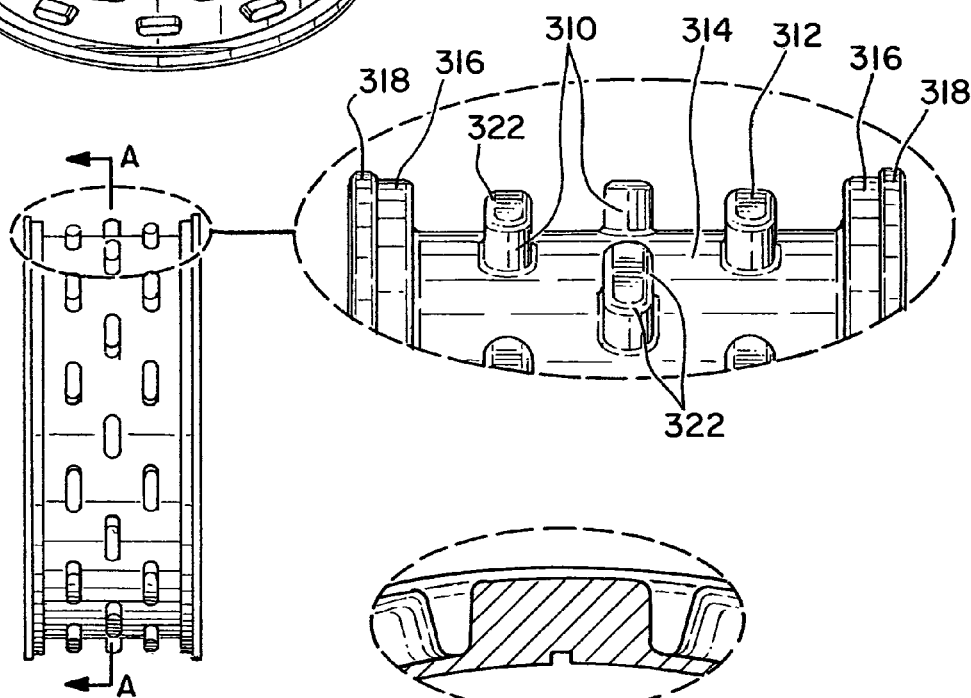
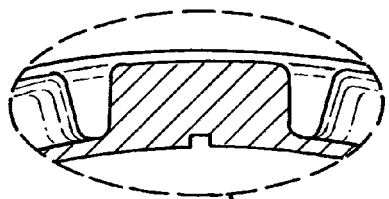
*Fig. 3B*
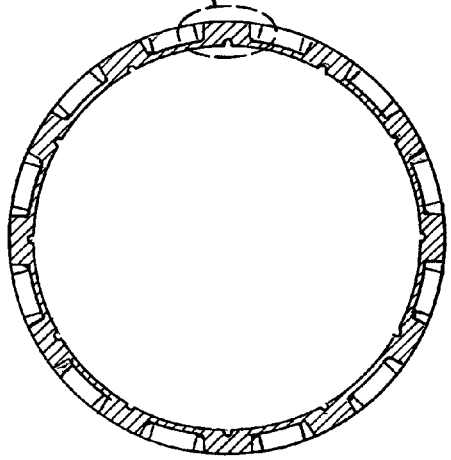
*Fig. 3C*
SECTION A-A

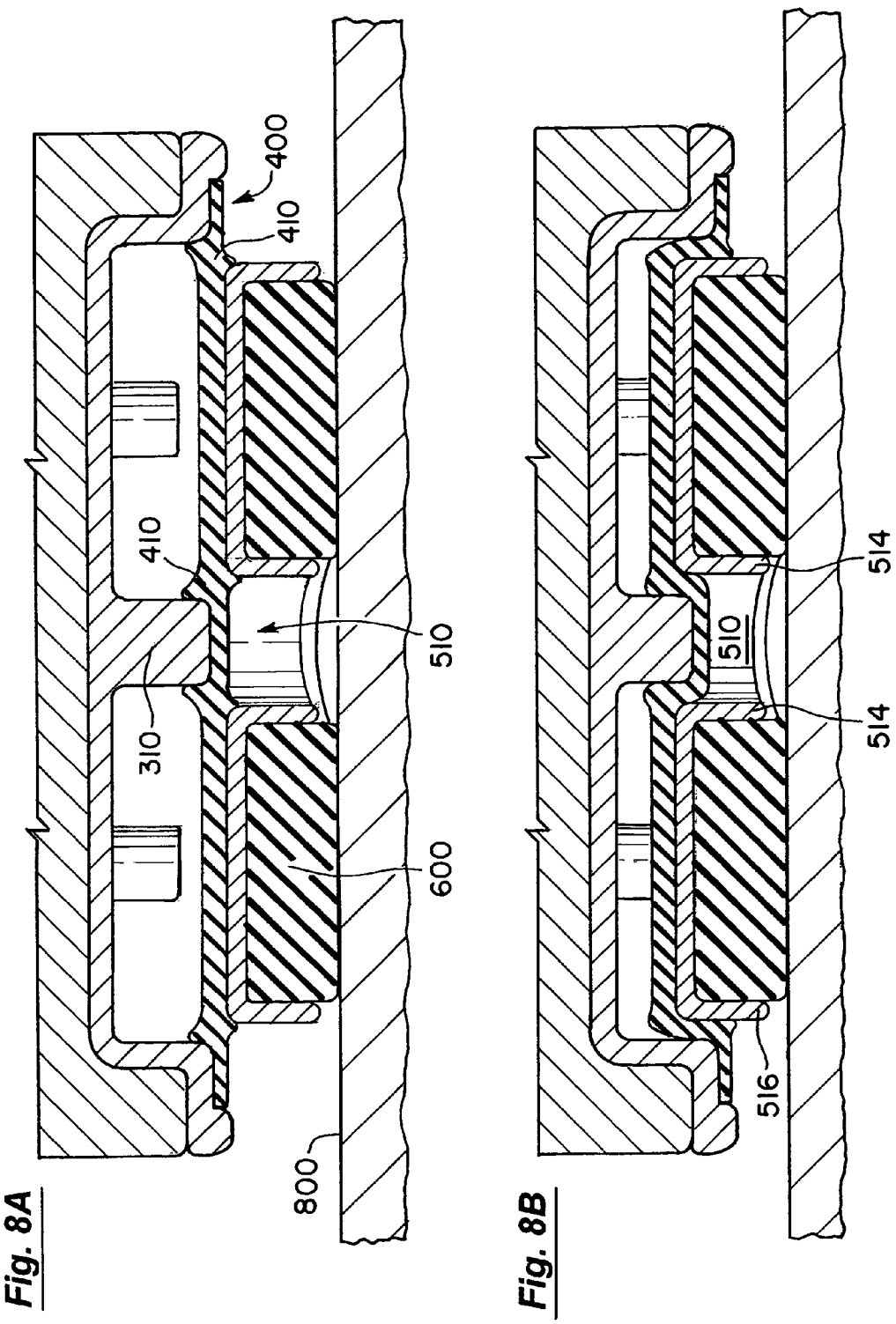

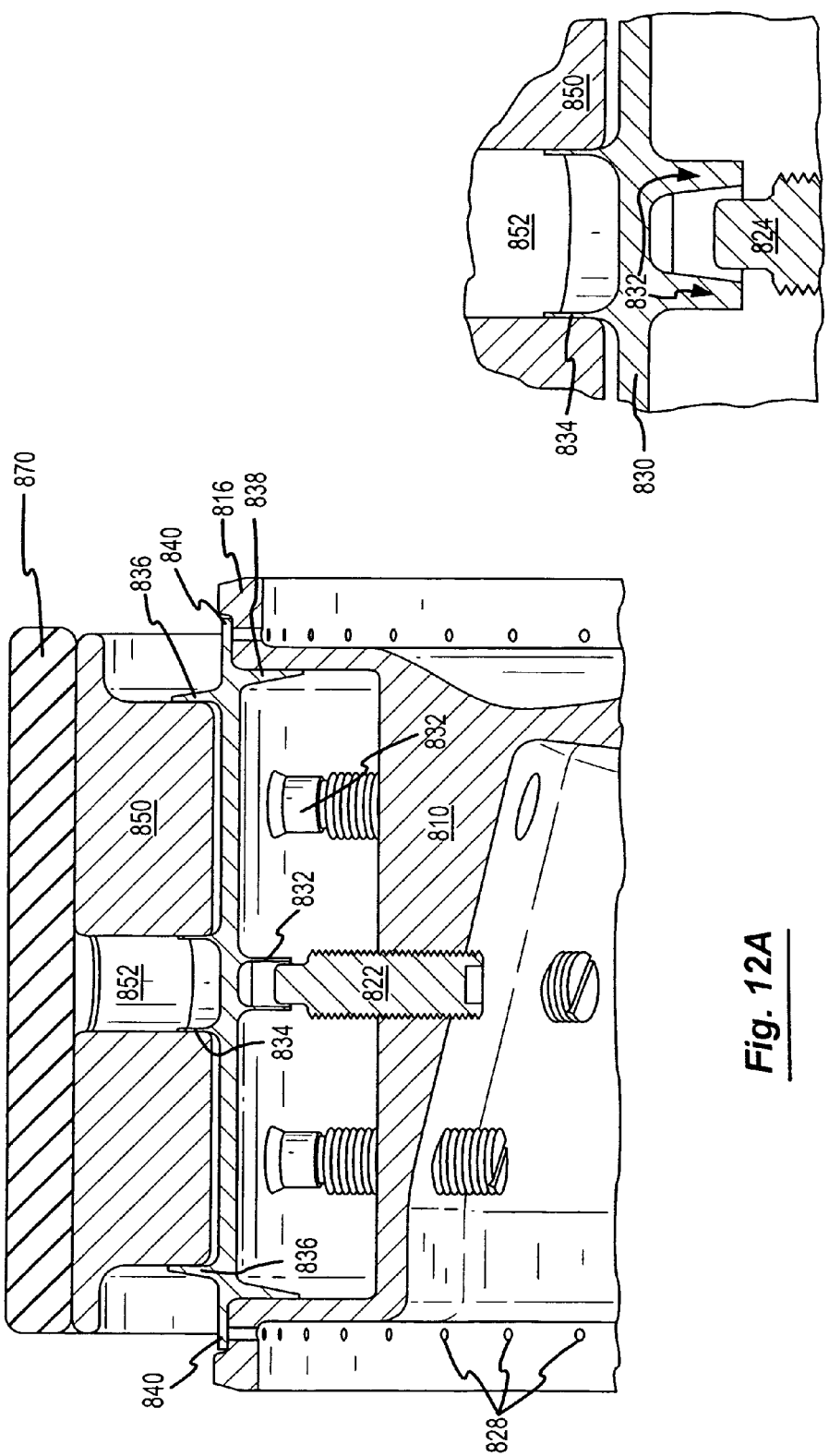

ENERGY RETURN WHEEL SYSTEMS AND METHODS

RELATED APPLICATIONS

The present application is a Continuation-in-Part (CIP), claiming priority from U.S. patent application Ser. No. 10/151,712, filed May 20, 2002 now U.S. Pat. No. 6,701,985, entitled "ENERGY RETURN WHEEL SYSTEMS AND METHODS," and U.S. patent application Ser. No. 10/778,944, filed Feb. 13, 2004 now abandoned, entitled "ENERGY RETURN WHEEL SYSTEMS AND METHODS," the complete disclosures of which are incorporated herein by reference for all purposes.

BACKGROUND OF THE INVENTION

The present invention relates generally to wheeled systems, and in particular, to wheeled systems having exemplary energy return features and methods of using and making same.

Since the days of ancient man, wheels have been used for a variety of purposes and with a variety of vehicles. Wheels have made possible carts, carriages, wagons, motorized and non-motorized vehicles, and the like, for the transportation of people and freight. The design of wheel assemblies for such items has focused on producing tires and wheels capable of accomplishing their intended use. Initially, this involved making wheel assemblies that were durable enough to travel over rough surfaces.

The invention of the automobile in the early 1900s, and the use of rubber and rubber compounds, increased the number and variety of wheeled systems. The introduction of air-inflated rubber tires resulted in a host of new design problems. A great amount of effort has been spent to make tires and wheel assemblies that have the desired resiliency and stability, maintain their integrity while inflated, are resistant to impacts and punctures, and the like. Great attention also has been given to developing various tread patterns to provide improved traction on paved or smooth surfaces.

One feature of tires and wheel assemblies which has not received particular emphasis involves the assemblies' energy return characteristics. For example, while current automobile tires generally provide sufficient traction, their development has not focused on how the tires interact with the road surface to transfer energy in an idealized fashion. Hence, notwithstanding the extensive use of wheeled systems, room for drastic improvement still exists in the field of energy return.

BRIEF SUMMARY OF THE INVENTION

The present invention provides exemplary wheel assemblies for use with a wide range of wheeled vehicles and/or wheeled apparatus. In one embodiment, the wheel assembly includes a rim having first and second circumferential edges defining a trough portion therebetween. A plurality of spaced protrusions are disposed in the trough portion. A resilient member is disposed over the plurality of spaced protrusions, and an actuator is disposed over the resilient layer. The actuator is adapted to at least partially compress the resilient layer between at least some of the spaced protrusions when the wheel assembly is loaded with a weight. The weight may include most any mass, including without limitation, motorized or non-motorized vehicles, one or more persons, freight, and the like. Rotation of the loaded wheel releases part of the compressed resilient member. In this manner, the wheel assembly is capable of providing energy return to the wheel assembly during rotation thereof.

In one aspect, the spaced protrusions are positioned to define at least two circumferential rings of protrusions. In another aspect, the resilient member is coupled to the first and second edges. The resilient member has, in some aspects, raised ridges in cooperation with the spaced protrusions, with the actuator, and/or with the circumferential edges of the rim. In one aspect, the resilient member is in cooperation with and/or coupled to the rim edges to define a generally hermetically-sealed chamber.

In one aspect, the actuator comprises a generally cylindrical-shaped band, with the band having a plurality of spaced apart holes formed therethrough. The holes, in one aspect, are positioned to be in cooperation with the plurality of spaced apart protrusions. In one aspect, the spaced apart protrusions and/or the resilient member are adapted to extend at least part way into the spaced apart holes of the actuator when the wheel assembly is loaded with the weight. In another aspect, the resilient member is adapted to recede from the actuator band holes when the loaded weight on the wheel assembly is removed or lessened. In one aspect, the actuator and resilient member are each generally circular in cross-section, and the actuator has a greater hoop strength than does the resilient member.

In one aspect, the resilient member comprises a compressible rubber, or other resilient or elastic material. In this manner, the resilient member is capable of storing energy when it is stretched under a load, and returning the stored energy when the load is removed or lessened. In one aspect, the wheel assembly further includes a traction layer disposed over the actuator. The traction layer may have any number of different tread pattern(s), or no pattern.

In one embodiment, the rim trough portion has a plurality of spaced holes adapted to fixedly or adjustably receive the spaced protrusions. In one aspect, the height of at least some of the spaced protrusions is separately adjustable. In this manner, the tension created between the resilient member and the protrusions may be controlled or altered.

In one aspect, the wheel assembly includes a coupling device for coupling the resilient member to the rim. In one aspect, the coupling device includes one or more flexible strips having a plurality of spaced extensions extending therefrom. In one aspect, the spaced extensions are adapted to be received in a plurality of spaced holes in the rim, and in a particular aspect, the rim holes are disposed in the first and second circumferential edges.

In one embodiment of the present invention, a wheel assembly includes a rim having a plurality of spaced protrusions adjustably coupled thereto. A resilient member is disposed over the plurality of spaced protrusions and an actuator is disposed over the resilient layer. The wheel assembly includes a means for coupling the resilient member to the rim. Further, the actuator is adapted to at least partially compress the resilient layer between at least some of the spaced protrusions.

In one aspect, the means for coupling the resilient member and the rim is a flexible strip having extensions disposed through cooperating holes in the resilient member and the rim. Alternatively or in addition, the means for coupling is a stitching, an adhesive, or the like.

Other features and advantages of the invention will appear from the following description in which the preferred embodiments have been set forth in detail in conjunction with the accompanying drawings.

BRIEF DESCRIPTION OF THE DRAWINGS

FIGS. 1A and 1B depict an overall view and a front view, respectively, of a wheel assembly according to one embodiment of the present invention;

FIG. 3A is an overall view of a chamber portion of a wheel assembly according to an embodiment of the present invention;

FIGS. 3B and 3C are a front view and a side cross-sectional view, respectively, of the chamber portion shown in FIG. 3A;

FIGS. 8A, 8B and 8C are close-up front cross-sectional views of a portion of a wheel assembly according to the present invention in unloaded (FIG. 8A) and loaded (FIGS. 8B–8C) states, respectively;

FIG. 12A is a cross sectional view of the wheel assembly shown in FIG. 9A;

FIG. 12B is a cross section of a portion of the wheel assembly of FIG. 12A;

DETAILED DESCRIPTION OF THE INVENTION

Figure 2A:
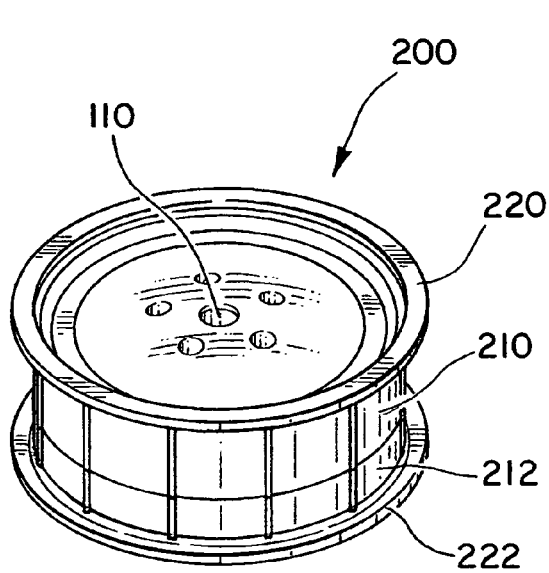
FIGS. 2A and 2B are an overall view and a front view, respectively, of a rim for use in wheel assemblies of the present invention.
Figure 2B:
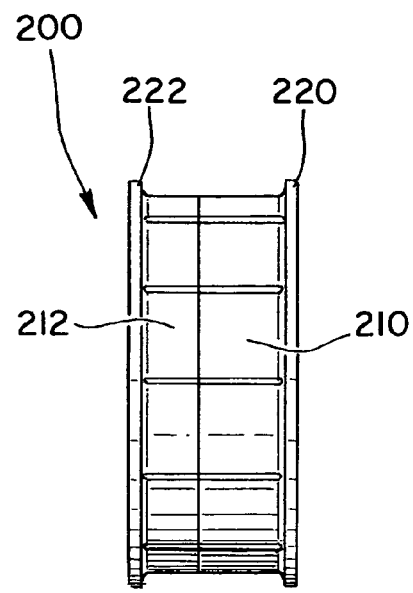
Figure 2C:
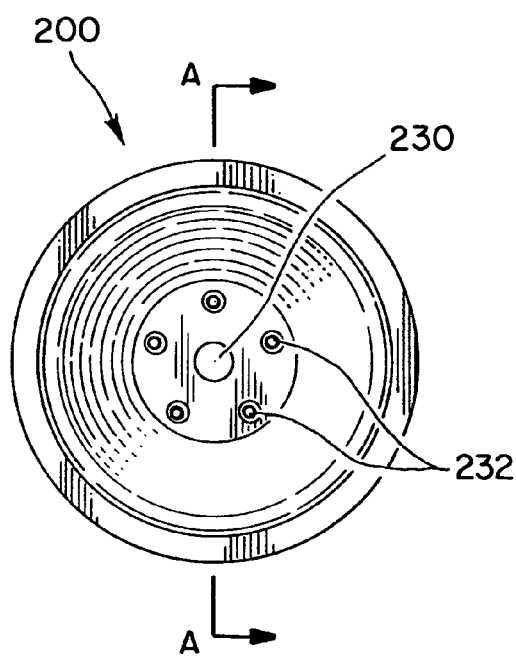
FIGS. 2C and 2D are a side view and a cross-sectional view taken along A—A, respectively, of the rim shown in FIG. 2A.
Figure 2D:
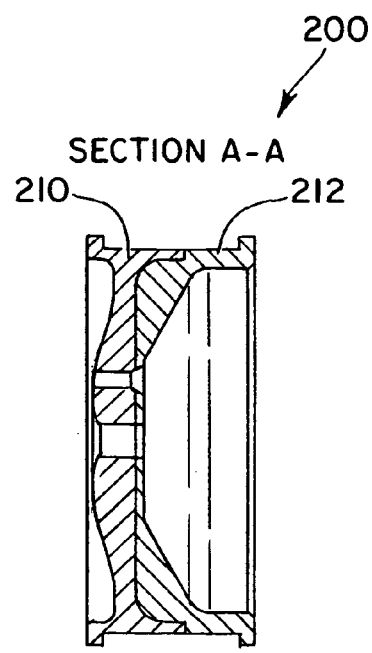

FIGS. 1A and 1B depict a wheel assembly 100 according to one embodiment of the present invention. Wheel assemblies 100 will find use with a wide range of wheeled vehicles, both motorized and non-motorized. For example, wheel assemblies 100 may be used with automobiles, trucks, sports utility vehicles (SUVs), minivans and the like. Wheel assemblies 100 will find use with two-wheeled vehicles such as motorcycles, motorscooters, non-motorized scooters, and bicycles. Further, wheel assemblies 100 of the present invention may be used with a wide range of other wheeled items, including unicycles, tricycles, carts, strollers, tractors, wheel-barrows and the like.

Wheel assemblies 100 of the present invention have exemplary characteristics for the transfer of energy from one state to another. In a particular aspect, wheel assemblies 100 are adept at transferring potential energy into kinetic energy in an efficient manner. Wheel assemblies 100 help focus the transfer of energy in line with the direction of travel of the wheel. In this manner, energy otherwise wasted, such as with the flexing and unflexing of tire sidewalls, can be minimized or avoided.

As seen in FIGS. 1A and 1B, wheel assembly 100 has a central opening 110 for mounting the wheel to an axle, hub, or the like. In one embodiment, wheel assembly 100 has a diameter 112 ranging from about twenty (20) inches to about thirty (30) inches, and a width 114 ranging from about six (6) inches to about twelve (12) inches. In a particular embodiment, diameter 112 is about twenty-eight (28) inches and width 114 is about twelve (12) inches. It will be appreciated, however, by those skilled in the art that additional wheel assembly dimensions are within the scope of the present invention, depending in part on the intended use of wheel assembly 100. Wheel assemblies 100 comprise one or more components, at least some of which are described and shown in subsequent Figures.

Turning to FIGS. 2A–6B, various components of one embodiment of wheel assembly 100 according to the present invention will be described. FIGS. 2A–2D depict a rim 200 for use with wheel assembly 100. Rim 200 has a first rim portion 210 and a second rim portion 212. Rim portion 210 has a lip or circumferential edge 220. Similarly, rim portion 212 has a lip or circumferential edge 222. As shown in FIG. 2B, the two rim portions 210 and 212 are coupled together so that edges 220, 222 define outer edges of rim 200. As can be seen in FIGS. 2B and 2D, such a configuration provides a generally trough-shaped rim 200 when viewed in cross section, or from the front or rear. Rim portions 210 and 212 may be coupled together in a variety of ways known to those skilled in the art, including by bolt, weld and the like. Further, rim 200 has a central opening 230, and a number of spaced holes 232 so that rim 200 may be coupled to a vehicle (not shown) by way of bolts, lug nuts, and the like.

In one embodiment, vehicle wheel assembly 100 includes a chamber portion 300 as shown in FIGS. 3A–3D. Chamber portion 300 comprises a generally cylindrical member having a generally trough-shaped upper or lower portion when viewed from the front or rear (FIG. 3B). More specifically, chamber portion 300 has a bottom surface 314 disposed between two outer lip or edge portions. In a particular embodiment, chamber portion 300 has an inner lip 316 and an outer lip 318 bordering one or both sides of bottom surface 314. In an alternative embodiment, only a single lip is disposed on each side of bottom surface 314. Preferably, the overall shape of chamber portion 300 generally coincides with the shape of rim 200. In this manner, chamber portion 300 may be disposed around rim 200, and maintained between rim edges 220 and 222. In particular embodiments, chamber portion comprises a nylon, one or more metal alloys, a composite, or the like. In one embodiment, bottom surface 314 is about 0.25 inches thick.

Chamber portion 300 includes a plurality of spaced-apart protrusions or posts 310 as can be seen in FIGS. 3A and 3B. The number of protrusions 310 will depend in part upon their desired spacing, the width and diameter of chamber portion 300, as well as the size of protrusions 310. In some embodiments, protrusions 310 are positioned to define one or more circumferential rings of protrusions 310. In the particular embodiment shown in FIG. 3B, protrusions 310 are positioned to define three circumferential rings of spaced protrusions 310. Protrusions 310 in the inner and outer rings have a similar or identical pattern. The middle ring of protrusions 310 has a similar spacing between protrusions 310 within the ring, but the ring is rotationally offset from the two outer rings by approximately one-half the distance between two adjacent protrusions 310 (FIG. 3B). Other arrangements of protrusions 310 also fall within the scope of the present invention. For example, protrusions 310 may be arranged in two (2) circumferential rings, or four (4) or more circumferential rings depending, in part, on width 114 of wheel assembly 100.

The overall shape of protrusions 310 also may vary within the scope of the present invention. In a particular embodiment, protrusions 310 have a generally oval, elongated oval or elliptical shape. Each protrusion 310 also has an upper surface 312 that is generally oval, elongated oval or elliptical in shape. Protrusions 310 preferably have rounded or smooth upper edges 322 adjoining surface 312.

Figure 4A:
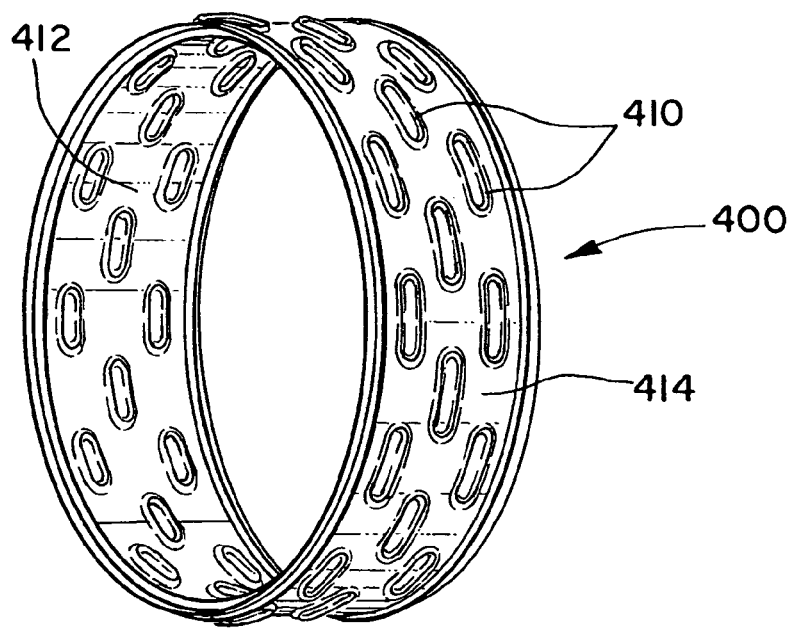
FIGS. 4A and 4B are an overall view and a front view, respectively, of a resilient member for use in a wheel assembly according to the present invention.
Figure 4B:
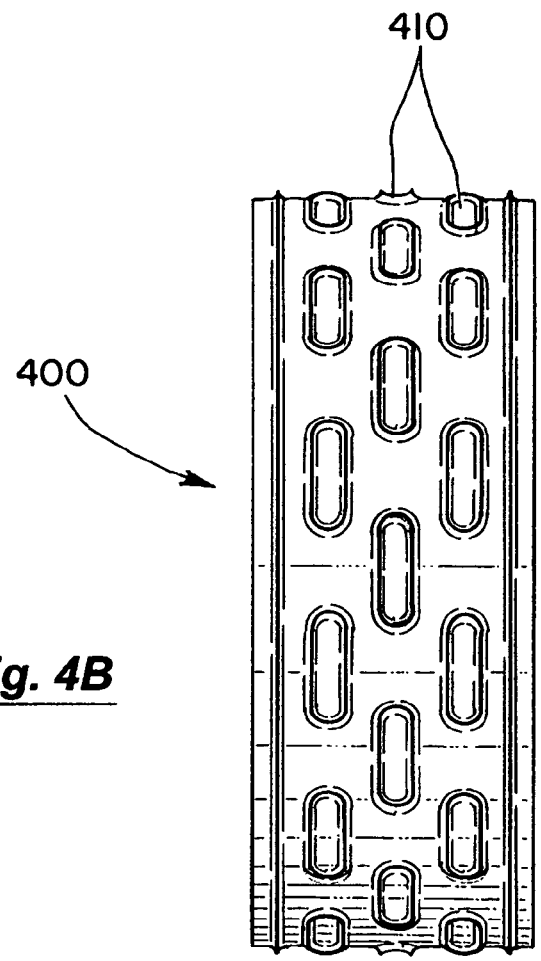

Wheel assembly 100 includes a resilient member 400 disposed over chamber portion 300. As can be seen in FIGS. 4A and 4B, resilient member 400 is a generally cylindrical-shaped resilient member 400 having an inner surface 412 and an outer surface 414. In one embodiment, inner surface 412 has a plurality of raised ridges 410 extending therefrom. Similarly, in one embodiment outer surface 414 has a plurality of raised ridges 410 extending therefrom. As can be seen in FIGS. 4A and 4B, in a particular embodiment, raised ridges 410 are shaped and positioned in a similar fashion as protrusions 310 of chamber portion 300. In this manner, in one embodiment, raised ridges 410 are in cooperation with the protrusions 310 of the underlying chamber portion. In a particular embodiment, ridges 410 on inner surface 412 are oval, elongated oval or elliptical in shape.

In one embodiment, the outer edges of resilient member 400 are adapted to be coupled to lips 316 and/or lips 318 of chamber portion 300. Resilient member 400 may be coupled to chamber portion 300 using lamination, a chemical bond, stitching, and the like. In an alternative embodiment, resilient member 400 is maintained in cooperation with chamber portion 300. In one such embodiment, resilient member 400 is held in place relative to chamber portion 300, at least in part, by overlying structure described below.

In one embodiment, the thickness of resilient member 400 varies across its width. For example, the thickness of the edges of resilient member 400 are between about 0.125 inches and 0.25 inches. The portion of resilient member 400 spaced apart from bottom surface 314 is about 0.25 inches. The portion of resilient member 400 where ridges 410 exist may be between about 0.25 inches and about 0.50 inches thick. In this manner, resilient member 400 thickness varies, with the thicker portions generally abutting adjacent structure such as chamber portion 300. It will be appreciated by those skilled in the art that the above dimensions are for a particular embodiment, and other thicknesses fall within the scope of the present invention.

In a particular embodiment, resilient member 400 comprises a rubber. Resilient member 400 may comprise a natural rubber, a synthetic rubber, or some combination thereof. In this manner, resilient member 400 has exemplary elastic characteristics. The stretching of resilient member 400, as further described below, results in the storage of energy as potential energy in the stretched resilient member 400, similar to a stretched rubber band. Upon its release, resilient member 400 returns an extremely large percentage approaching one hundred percent (100%) of the stored energy in the form of kinetic energy. The present invention directs that energy in a desired fashion to facilitate a rolling motion of wheel assembly 100.

Figure 5A:
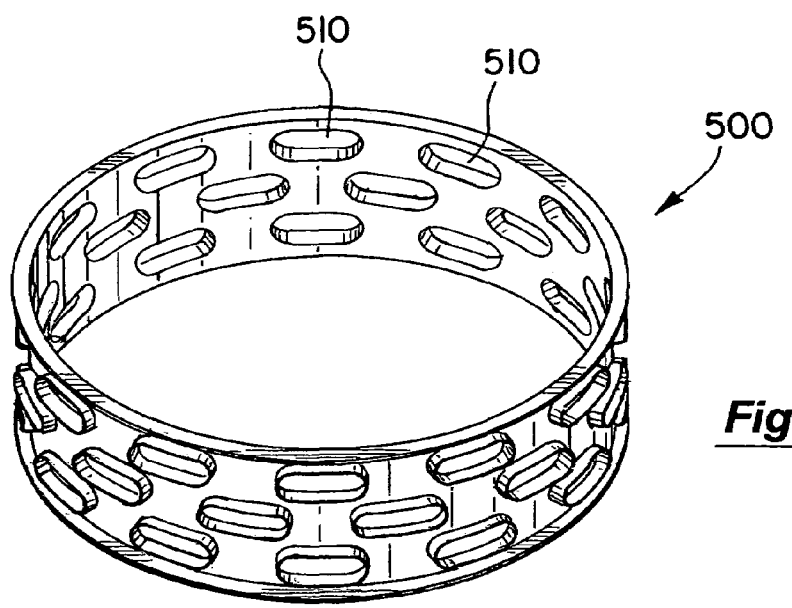
FIGS. 5A and 5B are an overall view and a front view, respectively, of an actuator for use with wheel assemblies according to embodiments of the present invention.
Figure 5B:
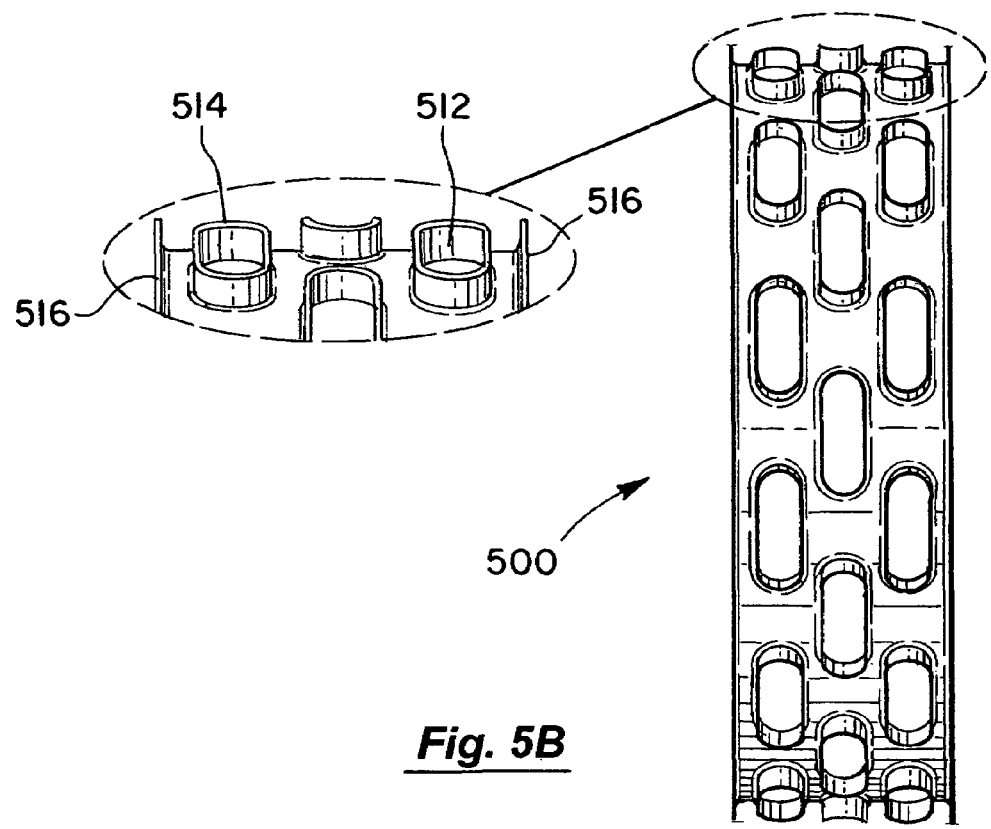

Turning now to FIGS. 5A–5B, an actuator component 500 according to the present invention will be described. Actuator 500 preferably is disposed over resilient member 400. As can be seen in FIG. 5A, actuator 500 has a plurality of spaced-apart holes 510. Again, in one embodiment, holes 510 are spaced apart to define circumferential rings of holes 510 about the generally cylindrical actuator 500. Holes may be defined in two (2), three (3) or more rings in some embodiments. Preferably, actuator 500 is positioned relative to resilient member 400 and chamber portion 300 so that holes 510 are disposed over or in cooperation with protrusions 310. Holes 510 may be in cooperation with ridges 410 on resilient member 400 outer surface 414.

Actuator 500, in one embodiment, has exterior edges or lips 516 disposed around one or both sides of the generally cylindrical actuator 500. Further, the outer surface of actuator 500 has a plurality of raised protrusions 512 each having an upper surface 514. Holes 510 are formed at the bottom of protrusions 512. In particular embodiments, actuator 500 comprises nylon, one or more metal alloys, a composite, or the like. Preferably, actuator 500 has a greater hoop strength than resilient member 400. Actuator 500 may comprise the same or substantially the same material as chamber portion 300, and hence may have the same or substantially the same hoop strength. In one embodiment, actuator 500 has a thickness that is from about 0.25 inches to about 0.50 inches.

Figure 6A:
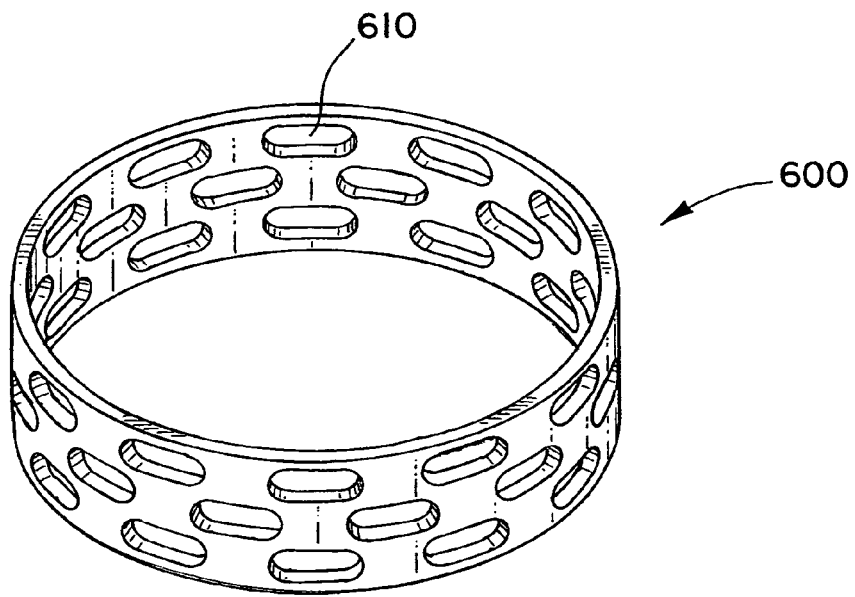
FIGS. 6A and 6B are an overall view and a front view, respectively, of a traction layer for use in a wheel assembly according to an embodiment of the present invention.
Figure 6B:
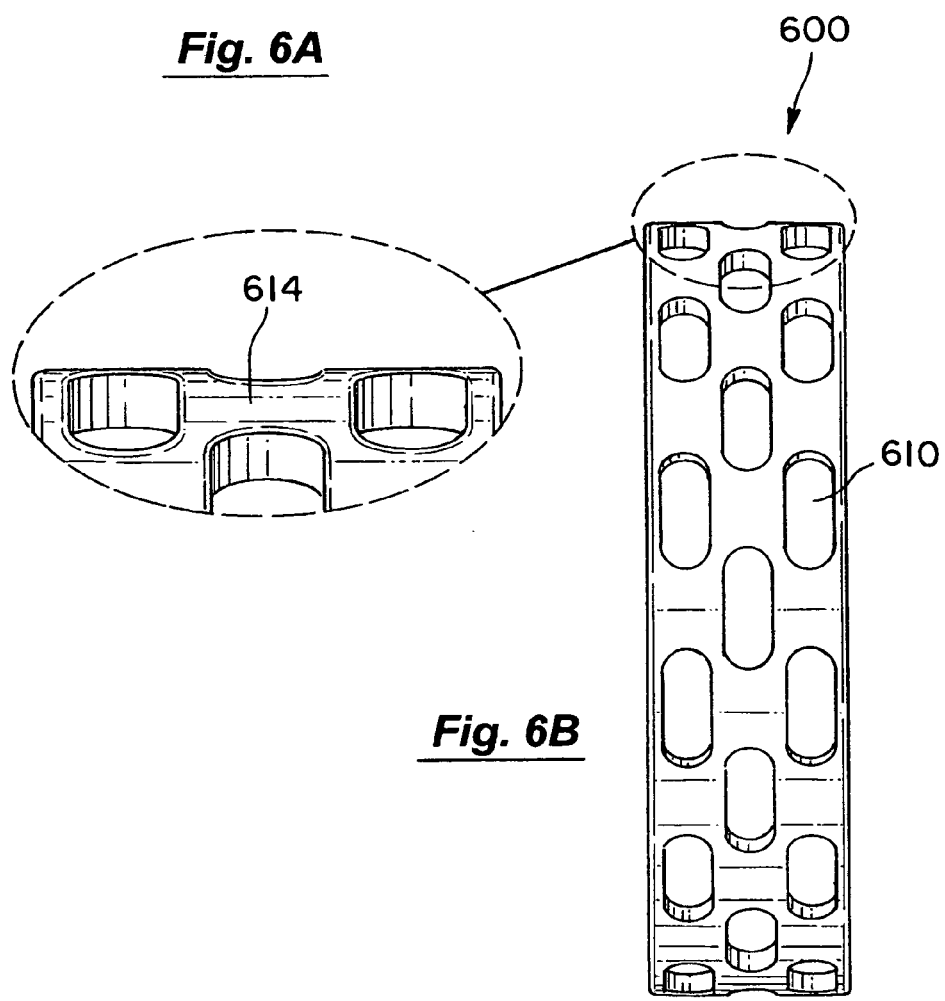

A traction layer 600, as shown in FIGS. 6A and 6B, is disposed over actuator 500. A plurality of spaced apart holes 610 are formed through traction layer 600. In a particular embodiment, holes 610 are in cooperation with holes 510 of actuator 500, and hence are spaced in a similar or identical pattern. While holes 510 and 610 are shown to be oval, elongated oval, elliptical or a similar shape, the shapes of holes 510 and 610 may vary within the scope of the present invention. In a particular embodiment, protrusions 310, holes 510 and holes 610 all have the same general shape. In another embodiment, protrusions 310, holes 510 and hole 610 have similar spacing and arrangement. In a particular embodiment, traction layer 600 comprises a hard and substantially incompressible rubber compound.

In one embodiment, traction layer 600 has a generally smooth outer surface 614 between holes 610. In other embodiments, surface 614 is a grooved surface. For example, in a particular embodiment, outer surface 614 has a plurality of grooves formed therein similar to grooves found in bicycle or automobile tires. Such grooves (not shown) would facilitate traction in inclement weather or on rough surfaces.

Figure 7A:
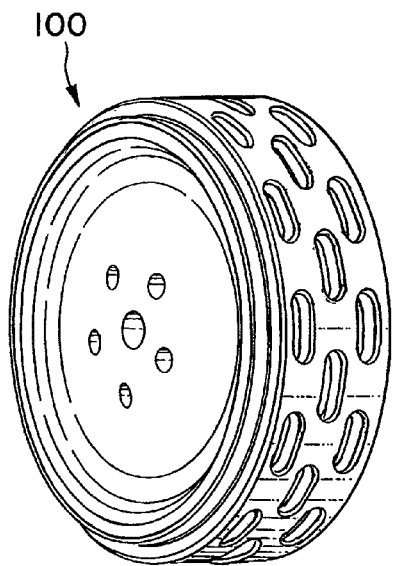
FIG. 7A is an overall view of a wheel assembly according to an embodiment of the present invention.
Figure 7B:
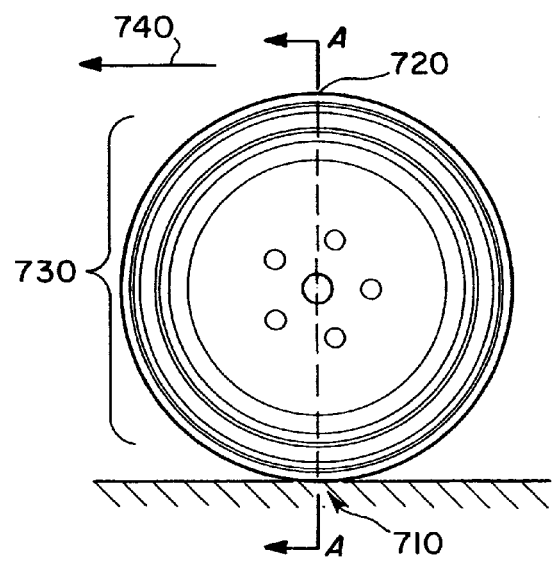
FIGS. 7B and 7C are a side view and a front cross-sectional view, respectively, of the wheel assembly shown in FIG. 7A.
Figure 7C:
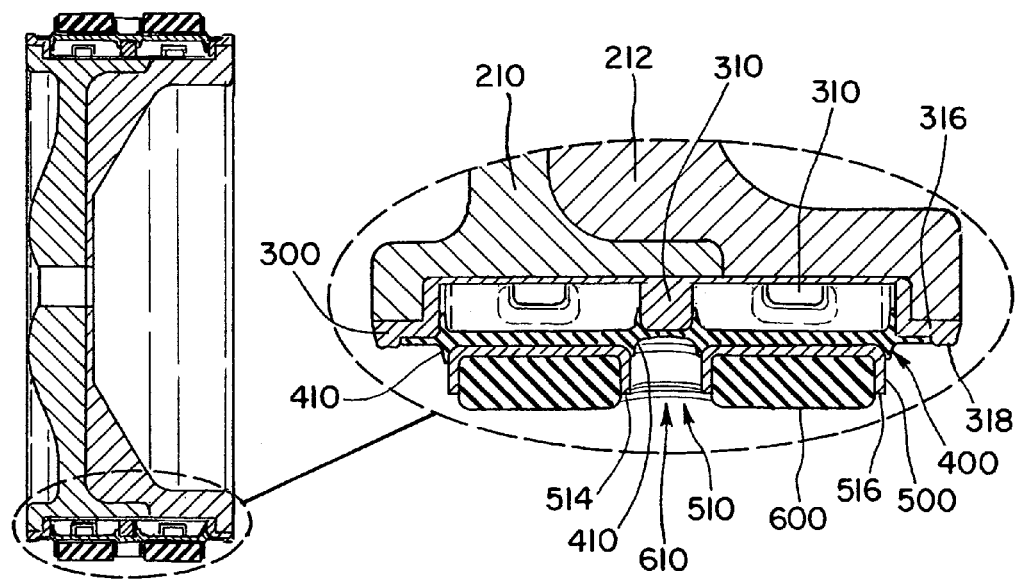

Turning now to FIGS. 7A–7C, one embodiment of wheel assembly 100 will be described. In a particular embodiment, chamber portion 300, resilient member 400, actuator 500 and traction layer 600 are arranged together to define a cartridge. This cartridge is coupled to rim 200. This may occur, for example, by placing the cartridge onto one of rim portions 210, 212 and subsequently coupling the two rim portions 210, 212 together. In this manner, apparatus of the present invention may be used and incorporated with rims having similar construction to that currently used for automobiles or other existing vehicles.

As best seen in FIG. 7C, which is a cross-sectional side view of the lower portion of wheel assembly 100, first and second rim portions 210 and 212 are coupled together so that lips 220 and 222 are disposed around the cartridge. In particular, lips 220 and 222 are in cooperation with chamber portion 300. With rim portions 210, 212 coupled together, lips 220 and 222 maintain the cartridge on rim 200. In one embodiment, an adhesive, such as an epoxy, also is used on rim portions 210 and/or 220 to help maintain the cartridge in place.

Chamber portion 300 has a center protrusion 310 through which the cross-sectional depiction of FIG. 7C is taken. Protrusions 310 depicted to the left and right of the center protrusion in FIG. 7C are not in the same plane as center protrusion 310. These protrusions 310 are visible in the cross section, however, due to the substantially hollow nature of the trough-shaped chamber portion 300 between the protrusions.

Resilient member 400 is disposed over chamber portion 300. In one embodiment, resilient member 400 is coupled to lip 316 and/or lip 318 of chamber portion 300. Again, resilient member 400 and chamber portion 300 may be coupled together by way of lamination, chemical bond, stitching, and the like. Alternatively, resilient member 400 is placed over chamber portion 300 and maintained in place by the structures of chamber portion 300, resilient member 400 and actuator 500 without the need for a coupling mechanism or adhesive.

Ridges 410 can be seen on both inner surface 412 and outer surface 414 of resilient member 400. Ridges 410 on inner surface 412 of resilient member 400 are positioned to engage upper edges 322 of protrusion 310. As shown, in one embodiment ridges 410 on inner surface 412 are shaped and positioned so that they have a larger diameter or semi-major axis compared to the diameter or semi-major axis of protrusion 310. Ridges 410 help maintain resilient member 400 in the proper relationship relative to chamber portion 300. In a particular embodiment, the combination of ridges 410 on both surfaces 412, 414 of resilient member 400 result in resilient member 400 being about twice as thick at those locations than the resilient member 400 thickness at locations devoid of ridges 410.

Ridges 410 further define a thickened portion of resilient member 400 around lips 316. These thickened portions of resilient member 400 help accommodate greater stresses due to the stretching of resilient member 400 when wheel assembly 100 is loaded with a weight. Similarly, ridges 410 on outer surface 414 of resilient member 400 are in cooperation with hole 510 of actuator 500. In one embodiment, ridges 410 on outer surface 414 have a smaller diameter or semi-major axis than holes 510 in actuator 500. In this manner, ridges 410 help maintain resilient member 400 in the proper relationship with respect to both the underlying chamber portion 300 and the overlying actuator 500.

Wheel assembly 100 includes traction layer 600, disposed over actuator 500 as shown in FIG. 7C, with holes 610 and 510 aligned as shown. In one embodiment, traction layer 600 extends about 0.25 inches to about 0.50 inches above upper surfaces 514 of raised protrusions 512. In a particular embodiment, the cartridge is between about 1.5 inches and about 3.0 inches thick, measured from the rim-contacting surface of chamber portion 300 to outer surface 614 of traction layer 600.

Turning now to FIGS. 8A and 8B, the operation of one embodiment of wheel assembly 100 according to the present invention will be described. FIG. 8A depicts wheel assembly 100 in an unloaded or unweighted position. In this configuration, resilient member 400 is in a relaxed state. Once wheel assembly 100 is loaded with a weight, such as a vehicle, a person, or the like, wheel assembly 100 undertakes the position shown in FIG. 8B. The weighting of wheel assembly 100, such as against a surface or object 750, compresses traction layer 600 and actuator 500 towards chamber portion 300. This compression results in a stretching of resilient layer 400. As shown in FIG. 8B, central protrusion 310 is pressed into resilient member 400 causing resilient member 400 to stretch at least partially into actuator hole 510. Further, resilient member 400 may stretch so that protrusion 310 is at least partially disposed in hole 610 of traction layer 600. Due to the weight load, resilient member 400 also is stretched so that it is disposed at least partially in chamber portion 300. This occurs in at least some chamber portion 300 locations which are devoid of protrusions 310. Once wheel assembly 100 is loaded with the weight, the wheel assembly 100 settles into a static state as shown in FIG. 8B provided wheel assembly 100 is not rolling or moving.

Preferably, the materials and resilience of traction layer 600, actuator 500, resilient member 400, and chamber portion 300 are provided so that the loading of wheel assembly 100 with a weight will not cause resilient member 400 to be driven to the bottom 314 of chamber 300. This may be accomplished in a number of ways, for example, by having wheel assemblies 100 with a desired size compared to the size of the weight load or vehicle. Also, resilient member 400 thickness may be controlled so that a greater weight load can be held.

In a particular embodiment, chamber portion 300 is hermetically sealed by resilient member 400. This may be accomplished, for example, by hermetically sealing resilient member 400 to lip 316. In this manner, compression of resilient member 400 into chamber portion 300 causes an increase in gas or air pressure within the sealed chamber portion 300. Thus, when the weight load is increased, the gas or air pressure in chamber portion 300 increases to help counteract the weight load. A greater transfer of force also occurs when resilient member 400 returns to the relaxed state. This may occur, for example, when wheel assembly 100 is unloaded, such as by rolling wheel assembly 100 forwards or backwards. Further, the hoop strength of actuator 500 helps keep protrusions 310 from being driven too far into resilient member 400.

In still another embodiment, a vacuum is formed in chamber portion 300, with the vacuum maintained by hermetically sealing resilient member 400 to lip portion 316 and, if needed, to protrusions 310. Such an embodiment may be formed, for example, by sealing resilient member 400 to chamber portion 300 when the two components are in a sub-atmospheric facility or chamber. Gas or air pressure within chamber portion 300 is one (1) atmosphere (ATM), less than 1.0 ATM, and substantially a vacuum in alternative embodiments. In this embodiment, an upper portion 720 (FIG. 7B) of wheel assembly 100, opposite a portion 710 of wheel assembly 100 that is in contact with the ground, helps prevent resilient member 400 from contacting bottom surface 314. For example, as the weight load increases, actuator 500 at the road contacting portion 710 of assembly 100 is driven towards chamber portion 300. Due in part to the hoop strength of actuator 500, the actuator pulls away from resilient member 400, and/or pulls up on resilient member 400, near upper portion 720 of wheel assembly 100. The increased hoop strength of actuator 500 helps maintain actuator 500 in its cylindrical shape, effectively pulling the lower portion of actuator 500 upwards and forwards as well.

Figure 8C:
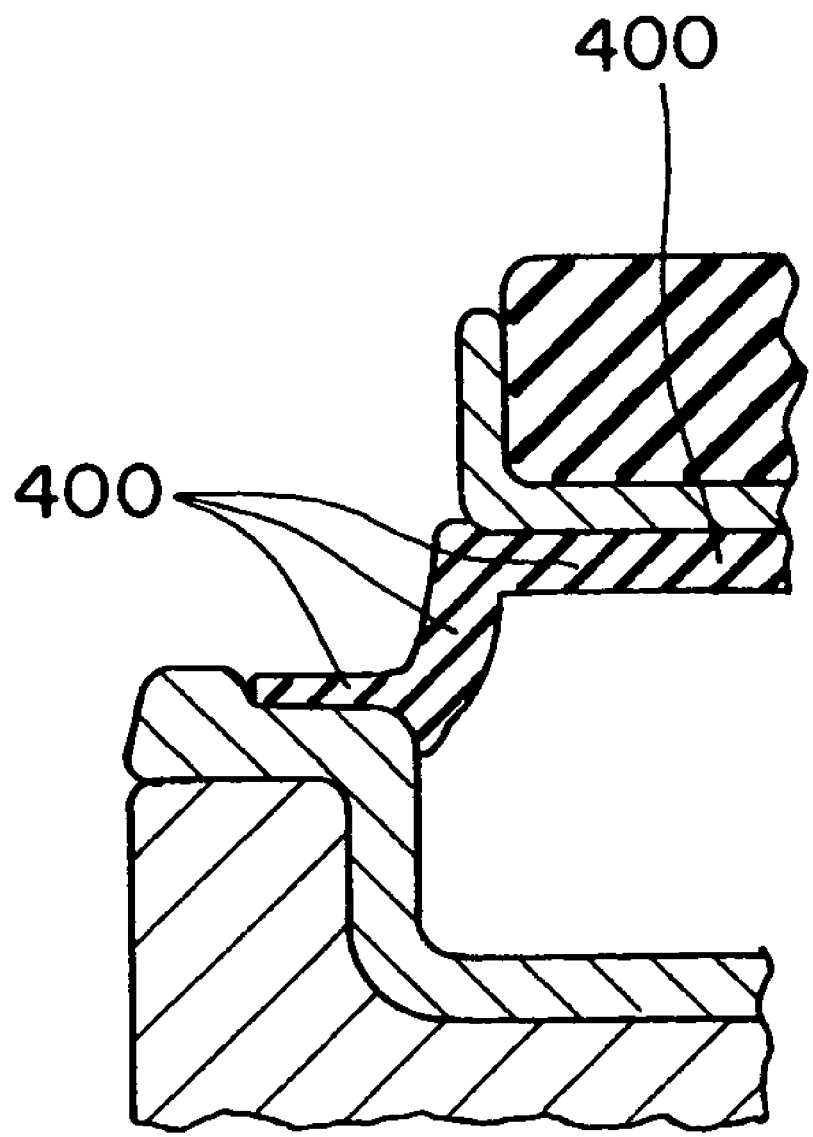

While the stationary loading and unloading of wheel assembly 100 has been described generally in conjunction with FIGS. 8A and 8B, some embodiments will be extremely useful for efficient vehicle travel. For example, the loaded wheel assembly 100 has a compressed lower assembly portion 710 contacting the road surface or ground. Due in part to the increased hoop strength of actuator 500 compared to the hoop strength of resilient member 400, actuator 500 attempts to remain in a generally circular configuration (when viewed from the side as in FIG. 7B) by pulling away from resilient member 400 at locations other than lower portion 710. In some embodiments, this force is exerted at upper portion 720 of wheel assembly 100 (FIG. 8C), and also along a periphery 730 of assembly 100. In such a manner, wheel assembly 100, when loaded, has a similar energy state as a wheel assembly resting on a small mound, ready to roll either forwards or backwards when given a slight forwards or backwards impulse, respectively, due in part to the loaded resilient member.

In one embodiment, as a vehicle having wheel assemblies 100 begins to move forward as shown by an arrow 740 in FIG. 7B, resilient member 400 is stretched or compressed into chamber portion 300, and stretched into actuator hole 510 by protrusion 310. This compression and/or stretching occurs largely at the ground-contacting portion 710 of assembly 100. The compression and/or stretching stores kinetic energy as an elastic strain in resilient member 400. As wheel assembly 100 continues to rotate so that the stretched or compressed portion rotates away from the ground or road surface, that portion of resilient member 400 returns to a more relaxed state and releases the stored energy. Further, as discussed above, the forward peripheral portion 730 of assembly 100 contains stored kinetic energy in that portion of resilient member 400, due in part to the hoop strength of actuator 500 resulting in actuator 500 attempting to stay in a generally circular shape. Once forward motion 740 has begun, the forward periphery portion 730 acts to pull wheel assembly 100 rotational forwards, similar to rolling down a hill. As a result, in some embodiments a large portion of wheel assembly 100 operates to assist vehicle travel, and not just the road contacting portion 710.

Further, the use of a substantially incompressible traction layer 600, as well as generally rigid materials for rim 200 and chamber portion 300, results in a more linear transfer of energy in the direction of travel. As will be appreciated by those skilled in the art, automobile travel with conventional tires, particularly upon turning, compresses the tire side wall. The side wall is constantly loaded and unloaded, with fibers in the sidewall straining to maintain the tire shape under extreme loads, such as during turning and braking. Further, the energy absorbed into the side wall is not transferred in a linear fashion to assist with the travel of the vehicle. A certain amount of this energy is lost in the creation of heat within the sidewall fibers.

In contrast, the present invention, in one embodiment, involves the stretching or compression and the subsequent relaxing or decompression of resilient member 400 generally aligned in the direction of travel. Hence, wheel assemblies 100 of the present invention provide for more efficient use of stored and returned energy compared to standard wheels. Further, resilient member 400 is composed of materials specifically designed for a highly efficient return of compressed energy. The loading and subsequent unloading of resilient member 400 by wheel assembly 100 rotation results in a large percentage of energy return from the stretched resilient member 400.

Figure 9A:
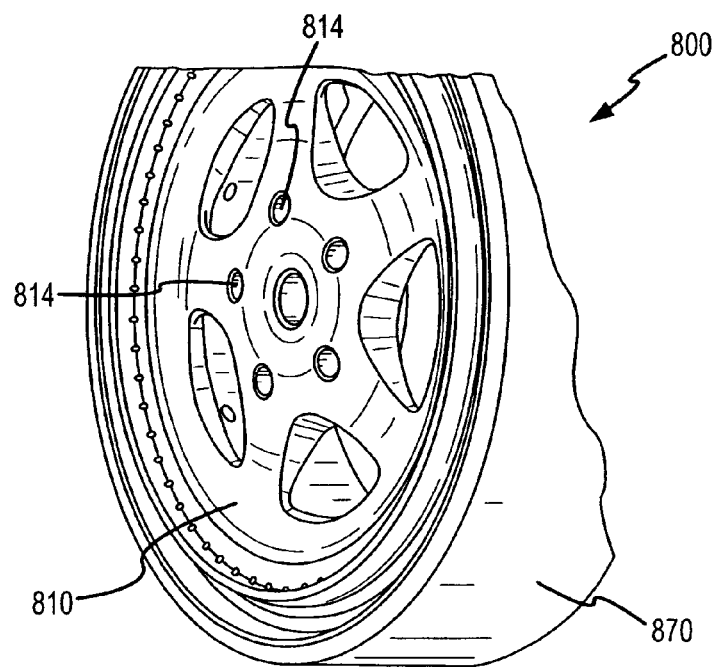
FIGS. 9A and 9B are overall views of a wheel assembly according to an embodiment of the present invention.
Figure 9B:
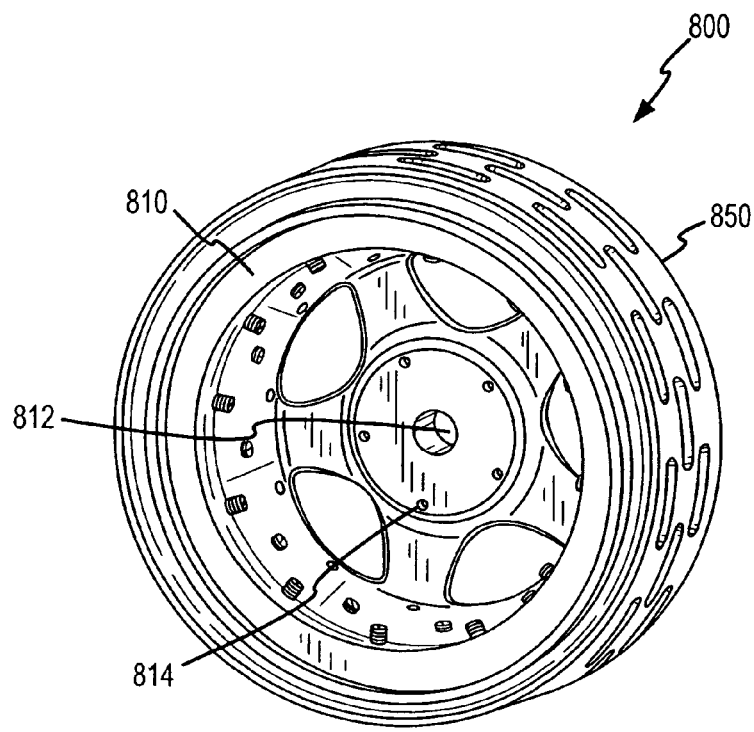

FIGS. 9A and 9B depict an alternative embodiment of a wheel assembly 800 according to the present invention. Wheel assembly 800 includes, in one embodiment, a tread 870 overlying the exterior of wheel assembly 800. Tread 870 may have a variety of tread patterns as previously noted, and may be made from a variety of rubbers, or other natural or synthetic compounds. Wheel assembly 800 includes a rim 810. Rim 810 includes a centrally located hole 812 so that wheel assembly 800 may be coupled to a vehicle or other structure. In on embodiment, a series of spaced holes 814 further facilitates coupling of wheel assembly 800 to an axel or other desired structure or vehicle using bolts, lug nuts, and the like. As further described in subsequent figures, an actuator 850 underlies tread 870, and overlies a resilient member and portions of rim 810.

Figure 10A:
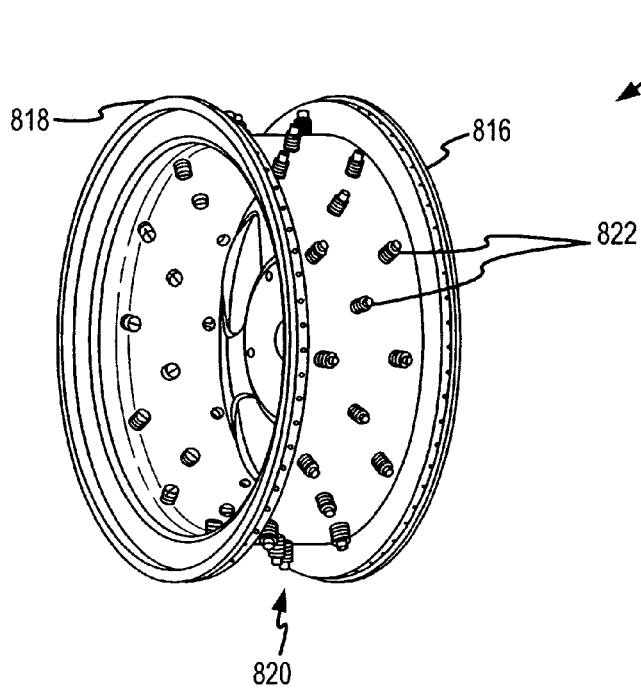
FIG. 10A is an overall view of a wheel hub and projection combination for use in wheel assemblies of the present invention.
Figure 10B:
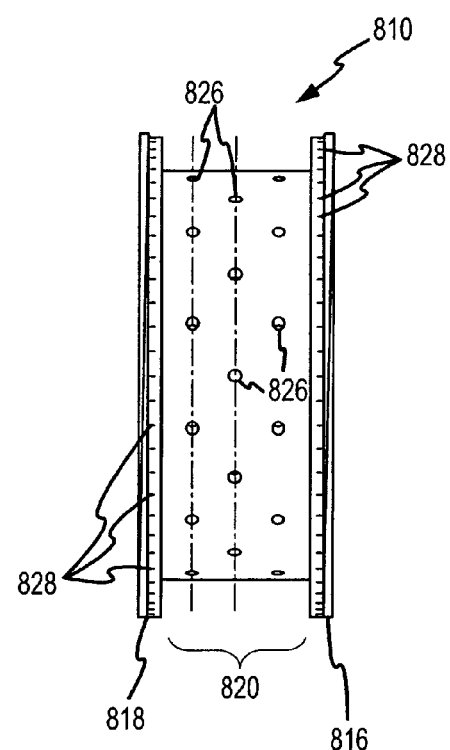
FIG. 10B is a front view of a wheel hub according to the present invention.

FIGS. 10A and 10B depict rim 810 in further detail. In one embodiment, rim 810 includes first and second circumferential edges 816 and 818. Edges 816 and 818 generally define a trough portion 820 therebetween. Edges 816 and 818 may have configurations different than that depicted in FIGS. 10A–10C. As shown in FIG. 10B, a plurality of holes 826 are disposed through the trough portion 820 of rim 810. In one embodiment, holes 826 are spaced generally uniformly about trough portion 820. In a particular embodiment, holes 826 define one (1), two (2), three (3), or more circumferential rings of holes 826. In some embodiments, at least some holes 826 are adapted to receive a projection 822.

Figure 10C:
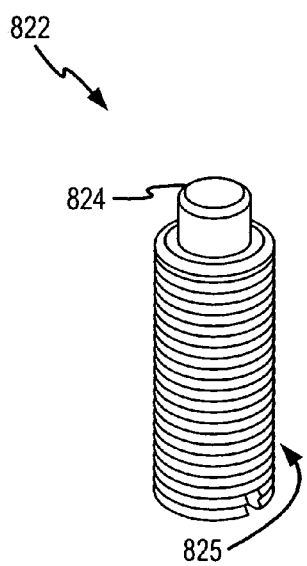
FIG. 10C is an overall view of a projection for use with the wheel hub shown in FIG. 10B.

One particular embodiment of projection 822 is shown in FIG. 10C, with projection 822 having a first portion 824 and a second portion 825. In one embodiment, second portion 825 is a threaded portion 825. First portion 824, in one embodiment, is not threaded and has a smaller diameter than does second portion 825. In other embodiments, first portion 824 may be threaded, and may have a diameter that is similar to, the same as or larger than a diameter of second portion 825. In one embodiment, second portion 825 is threaded in holes 826 to extend first portion 824 into trough 820. In this embodiment, holes 826 are threaded holes. In a particular embodiment, the height of projection 822 above the bottom of trough 820 is determined by an amount projection 822 is disposed through hole 826. In a particular aspect, the height is adjustable, such as by rotation or other movement of projection 822 into and/or through hole 826. In one embodiment, the height of projections 822 remain constant once established, such as by threading projections 822 though holes 826. In another embodiment the height of projections 822 is generally uniform throughout rim 810, while in other embodiments the height of projections 822 above trough portion 820 varies from projection to projection in a desired pattern, or in no pattern.

Figure 11A:
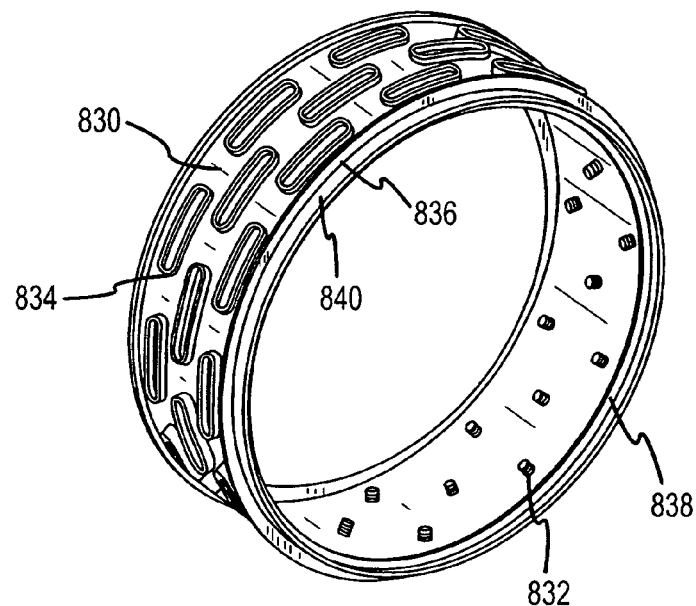
FIGS. 11A and 11B are overall views of a resilient member, and a wheel assembly including the resilient member, respectively, according to an embodiment of the present invention.
Figure 11B:
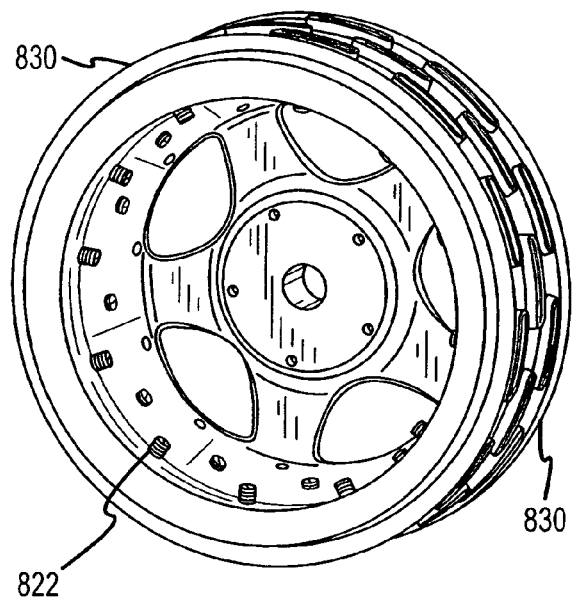

As shown in FIGS. 11A and 11B, wheel assembly 800 includes a resilient member 830 positioned on rim 810. In a particular embodiment, resilient member 830 is disposed over projections 822 in trough portion 820 as best shown in FIGS. 12A and 12B. In the cross-sectional view of FIG. 12A, resilient member 830 is shown having thicker or thinner portions. In one embodiment, a plurality of raised ridges 832 extend from one surface of resilient member 830. As shown in FIG. 12A, in one embodiment ridges 832 are adapted to receive the first portion 824 of protrusion 822. In this embodiment, the shape of ridges 832 may match that of protrusion first portions 824. For example, each ridge 832 may have a generally elliptical or oval shape, to match an elliptical or oval shaped end of first portion 824. Other shapes of ridges 832 and/or first portions 824 also fall within the scope of the present invention.

In one embodiment, a second plurality of raised ridges 834 extend from an opposing surface of resilient member 830 than do ridges 832. Ridges 834 are adapted to be received within a plurality of cavities 852 disposed through actuator 850. Ridges 834 may have a similar shape as cavities 852 in one embodiment. Alternatively, ridges 834 have a smaller or different shape than does cavities 852. In a particular embodiment, both cavities 852 and ridges 834 are oval or elliptical in shape, although other shapes also fall within the scope of the present invention. In this manner, ridges 832 and 834 help maintain the proper relationship between projections 822, resilient member 830, and actuator 850.

Figure 13A:
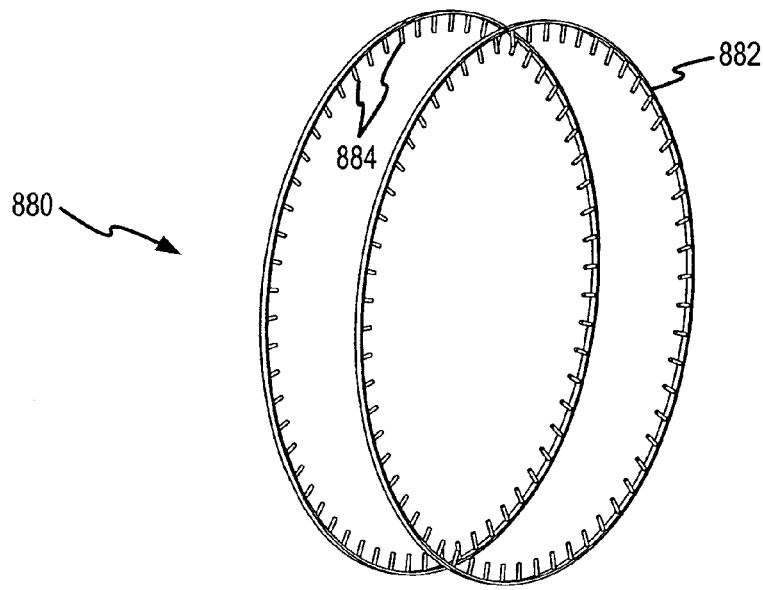
FIG. 13A is an overall view of a coupling device for use with wheel assembly embodiments of the present invention.

In one embodiment, resilient member 830 further includes outer ridges 836 and 838 that are adapted to engage rim 810 and actuator 850, as generally depicted in FIG. 12A. An outer lip portion 840 of resilient member 830 and ridge 838 together are in cooperation with circumferential ridges 816 and 818 of rim 810. In a particular embodiment, a series of holes (not shown) are disposed through outer lip portion 840 of resilient member 830 in a spaced arrangement. As further described in conjunction with FIGS. 13A–13B, the holes through outer lip portion 840 facilitate the coupling of resilient member 830 to rim 810 in a particular embodiment.

In one embodiment, the operation of wheel assembly 800 is similar to that described in conjunction with earlier figures. In particular, the loading of wheel assembly 800 with a force or weight compresses actuator 850 towards trough portion 820 of rim 810. During this compression, protrusions or projections 822, and in particular first portion 824 thereof, is adapted to stretch resilient member 830 at least partially into holes 852 of actuator 850. Similarly, actuator 850 is adapted to compress portions of resilient member 830 between the spaced protrusions 822. During the rotation of loaded wheel assembly 800, resilient member 830 returns stored energy in the general direction of wheel assembly 800 rotation. In this manner, loading and unloading of wheel assembly 800 facilitates energy transfer as described herein and in conjunction with earlier embodiments.

In one embodiment, the height of protrusions 822 within trough 820 may be adjusted so that protrusions 822 engage resilient member 830 throughout a portion of, or around the entire circumference of wheel assembly 800. In a particular embodiment, the amount protrusions 822 engage resilient member 830 may be adjusted over time. Such a feature may be useful, for example, if resilient member 830 stretches or loses some of its resiliency over time. As a result, a desired tension may be maintained on resilient member 830. In another embodiment, the tension on resilient member 830 throughout the circumference of wheel assembly 800 operates to direct the energy return in the direction of rotation of wheel assembly 800. As a result, when wheel assembly 800 rests or rolls on surface 750 located at "six-o-clock", the loading of resilient member 830 at the "three o-clock" and "nine-o-clock" positions assists with wheel assembly 800 rotation. This energy return is in addition to the compression and decompression of resilient member 830 at the surface 750 contacting portion of wheel assembly 800.

Figure 13B:
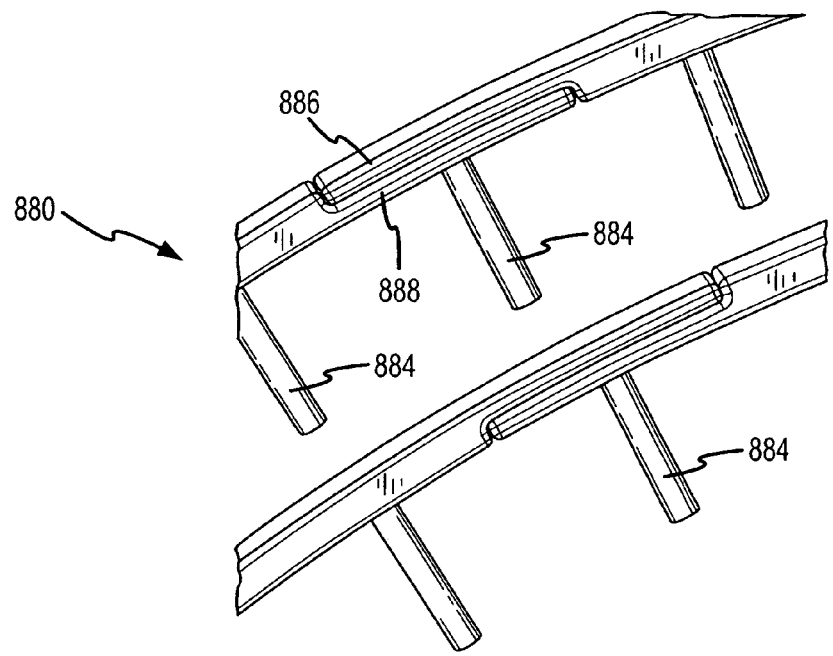
FIG. 13B is a close-up overall view of a portion of the coupling device shown in FIG. 13A.

In one embodiment, resilient member 830 is coupled to rim 810 using a variety of means for connecting the two. In a particular embodiment, the connection or coupling means includes a flexible strip 882 having a plurality of spaced extensions 884. In one embodiment, the height and/or width of opposing ends of strip 882 are reduced or narrowed to permit their joining in a manner that results in the joined end having about the same general thickness as the remainder of strip 882. Such a configuration is shown in FIG. 13B, depicting an end 886 of strip 882 having an extension 884 extending therefrom. An opposing end 888 of strip 882 has a narrowed section with a hole disposed therethrough (not shown). Extension 884 is disposed through the hole in end portion 888 to maintain strip 882 in the configuration shown in FIG. 13A. As previously noted, extensions 884 are adapted to be disposed through holes in outer lip portion 840 of resilient member 830. Extensions 884 are then positioned through holes 828 in rim 810. More particularly in one embodiment, extensions 884 are positioned through holes 828 in edges 816 and 818.

In a particular embodiment, coupling mechanism 880 is made of nylon, although other materials also may be used within the scope of the present invention. In this or similar embodiments, the materials used to form coupling device 880 may be fused, welded, melted, or the like to maintain the desired shape once coupling device 880 is positioned relative to resilient member 830 and/or rim 810. In some embodiments, tips of extensions 884 are disposed through rim holes 828 as can be seen in FIG. 9A. Alternatively, the tips of extensions 884 may be removed, fused, melted or the like. In another embodiment, a locking mechanism (not shown) is mated to tips of extensions 884 to help maintain strip 882 relative to rim 810 and/or resilient member 830. The locking mechanism may comprise, for example, a locking ring which couples to some or all of the tips of extensions 884 extending through rim 810. It will be appreciated by those skilled in the art that other coupling mechanisms 880 also fall within the scope of the present invention. In a particular embodiment, the mating of resilient member 830 to rim 810 results in a generally hermetically sealed chamber between trough portion 820 and resilient member 830. As noted in conjunction with prior embodiments, this chamber may be pressurized at or above one (1) atmosphere, or below one (1) atmosphere, including to vacuum. The general function of wheel system 800, in one embodiment, is similar to that described in conjunction with earlier figures.

The invention has now been described in detail for purposes of clarity and understanding. However, it will be appreciated that certain changes and modifications may be practiced within the scope of the appended claims.

What is claimed is:

1. A wheel assembly comprising:
   a rim having first and second circumferential edges defining a trough portion therebetween;
   a plurality of spaced protrusions disposed in the trough portion between the first and second circumferential edges;
   a resilient member disposed over the plurality of spaced protrusions;
   an actuator disposed over the resilient layer;
   wherein the actuator is adapted to at least partially compress the resilient layer between the spaced protrusions when the wheel assembly is loaded with a weight; and
   wherein the resilient member comprises an upper surface and a lower surface, the lower surface comprising a plurality of raised ridges, the raised ridges positioned to be in cooperation with the plurality of spaced protrusions.

2. The wheel assembly as in claim 1 wherein the resilient member upper surface comprises a second plurality of raised ridges in cooperation with the actuator.

3. A wheel assembly comprising:
   a rim having first and second circumferential edges defining a trough portion therebetween;

a plurality of spaced protrusions disposed in the trough portion between the first and second circumferential edges;

a resilient member disposed over the plurality of spaced protrusions;

an actuator disposed over the resilient layer;

wherein the actuator is adapted to at least partially compress the resilient layer between the spaced protrusions when the wheel assembly is loaded with a weight;

wherein the actuator comprises a generally cylindrical-shaped band, the band having a plurality of spaced apart holes formed therethrough;

wherein the spaced apart holes are positioned to be in cooperation with the plurality of spaced apart protrusions;

wherein the resilient member is adapted to stretch at least part way into at least some of the spaced apart actuator band holes when the wheel assembly is loaded with the weight; and wherein the resilient member is adapted to recede from the at least some spaced apart actuator band holes when the loaded weight on the wheel assembly is removed.

4. A wheel assembly comprising:

a rim having first and second circumferential edges defining a trough portion therebetween;

a plurality of spaced protrusions disposed in the trough portion between the first and second circumferential edges;

a resilient member disposed over the plurality of spaced protrusions;

an actuator disposed over the resilient member;

a coupling device for coupling the resilient member to the rim;

wherein the actuator is adapted to at least partially compress the resilient member between the spaced protrusions when the wheel assembly is loaded with a weight; and wherein the coupling device comprises a flexible strip having a plurality of spaced extensions extending therefrom.

5. The wheel assembly as in claim 4 wherein the plurality of spaced extensions are adapted to be received in a plurality of spaced holes in the rim.

6. The wheel assembly as in claim 5 wherein the plurality of spaced holes are disposed in the first and second circumferential edges.

7. A wheel assembly comprising:

a rim having first and second circumferential edges defining a trough portion therebetween;

a plurality of spaced protrusions disposed in the trough portion between the first and second circumferential edges;

a resilient member disposed over the plurality of spaced protrusions;

an actuator disposed over the resilient member;

a coupling device for coupling the resilient member to the rim;

wherein the actuator is adapted to at least partially compress the resilient member between the spaced protrusions when the wheel assembly is loaded with a weight;

wherein the coupling device comprises a first flexible strip for coupling a first edge portion of the resilient member to the first circumferential edge, and a second flexible strip for coupling a second edge portion of the resilient member to the second circumferential edge.

8. A wheel assembly comprising:

a rim having a plurality of spaced protrusions adjustably coupled thereto;

a resilient member disposed over the plurality of spaced protrusions;

a means for coupling the resilient member to the rim;

an actuator disposed over the resilient member;

wherein the plurality of spaced protrusions are disposed between first and second outer edges of the rim, the resilient member coupled to the first and second outer rim edges;

wherein the actuator is adapted to at least partially compress the resilient member between at least some of the spaced protrusions;

wherein the means for coupling comprises a flexible strip having extensions disposed through cooperating holes in the resilient member and the rim.

9. A wheel assembly comprising:

a rim having a plurality of spaced protrusions adjustably coupled thereto;

a resilient member disposed over the plurality of spaced protrusions;

a means for coupling the resilient member to the rim;

an actuator disposed over the resilient member;

wherein the plurality of spaced protrusions are disposed between first and second outer edges of the rim, the resilient member coupled to the first and second outer rim edges;

wherein the actuator is adapted to at least partially compress the resilient member between at least some of the spaced protrusions wherein the means for coupling comprises a stitching.

10. A wheel assembly comprising:

a rim having a plurality of spaced protrusions adjustably coupled thereto;

a resilient member disposed over the plurality of spaced protrusions;

a means for coupling the resilient member to the rim;

an actuator disposed over the resilient member;

wherein the plurality of spaced protrusions are disposed between first and second outer edges of the rim, the resilient member coupled to the first and second outer rim edges;

wherein the actuator is adapted to at least partially compress the resilient member between at least some of the spaced protrusions wherein the means for coupling comprises an adhesive.

* * * * *